Nov. 11, 1969          E. KUHNLE          3,477,531
                         SCALE
Filed March 30, 1967                    3 Sheets-Sheet 1

Inventor:
Ernst Kuhnle
by Michael S. Striker 3,477,531
SCALE
Ernst Kuhnle, Hermann Rommel Strasse 28,
Balingen, Württemberg, Germany
Filed Mar. 30, 1967, Ser. No. 627,602
Claims priority, application Germany, Apr. 1, 1966,
B 86,473
Int. Cl. G01g 23/14
U.S. Cl. 177—171        24 Claims

ABSTRACT OF THE DISCLOSURE

A scale, comprising balance means having spaced end portions respectively located on opposite sides of the fulcrum. First biasing means biases the balance means to one side of the fulcrum. Second biasing means normally counteracts the first biasing means and maintains the balance means in a position of equilibrium. Selector means reduces the biasing force exerted by the second biasing means by selectable amounts each of which corresponds to a given weight. Indicator means is operatively associated with the balance means for indicating when the same is in a position of equilibrium, as well as deviations from such position. Load supporting means is operatively connected with the balance means and arranged to support a variable-weight load so that, when the weight of such load equals the corresponding reduction in the biasing force selected with the selector means, the balance means is restored to its position of equilibrium.

BACKGROUND OF THE INVENTION

The present invention relates to scales in general, and more particularly to scales for filling and sorting operations. Still more particularly, the present invention relates to scales on which a predetermined weight can be pre-selected.

Scales are known in a great variety of different types, and for different purposes. The present invention is primarily concerned, however, with the type of scale in which a predetermined set weight is to be indicated. In other words, the type of scale here under discussion is of the variety used for the purpose of weighing a great number of identical articles. For instance, such scales are used if flour bags are to be filled to a given weight, for instance to a weight of five pounds. The scale is then only required to indicate when the desired weight is reached, and for this purpose the scale advantageously should give a zero indication.

Of course, scales are well known for the purpose of weighing a great number of identical objects. For instance, there is known in the art a scale in which an indicator moves along an arcuate scale and indicates thereon the weight of an article which is placed on the load platform of the scale. If this type of scale is used for applications in which for instance a great number of bags are to be filled to identical weights, then the scale is provided with control devices which are so arranged that, when the indicator reaches a predetermined graduation on the scale, electrical impulses are automatically supplied by the control devices for terminating for instance the filling action. It has, however, been found that scales of this type are not very practical for such applications, because on the one hand it is difficult to accurately determine weights below approximately 10 kg., and because on the other hand the range of indication requires relatively large movements of the balance beam and of the associated lever arrangement, requiring not only a rather elaborate construction but also expensive precautions against inaccuracies which occur in such constructions and lead to rather quick wear and deterioration of the movable parts.

To overcome these problems scales have been constructed, and are known from the prior art, which for filling or sorting applications simply indicate a zero weight. Thus, the desired weight for the article to be filled or sorted is pre-selected and the indicator shows for example a minus indication, that is the indicator will be below the zero point on the scale. When the article to be weighed is now brought up to the desired pre-selected weight, for instance by filling a bag with a certain material, then the indicator gradually moves to the zero position, and the desired weight is reached when the indicator registers with the zero graduation on the scale. With this type of arrangement the scale can be relatively short and need extend to the plus and the minus side of the zero graduation only for a short distance so that it can be readily determined whether the desired weight has been reached exactly, almost exactly or slightly exceeds it. Since with this type of arrangement the indicator must perform only relatively small movements over the scale, and since accordingly the lever arrangements and all associated components of the scale similarly perform only small movements, the entire measuring arrangement can be less elaborate than those known from prior art discussed earlier, and wear and tear on the components of such an arrangement are substantially reduced because of the smaller movements performed by the various movable components.

Scales of this type are, as has been indicated above, known from the prior art. However, while they constitute a definite improvement over the type of scale indicated at the beginning of this specification, they are not yet entirely satisfactory for various reasons. Among these is the fact that the means for indicating the zero or equilibrium position can be utilized only very slowly, with great difficulty and/or with little accuracy. This means that the zero indication, which is desirable for each article being weighed, is relatively inaccurate in these prior-art scales. Furthermore, there is not known to me from the prior art a scale which is capable of accurately functioning for use under all circumstances encountered in practical applications. By this it is meant that the prior-art constructions are not very well suited for certain applications, particularly for applications in which very small weights are to be measured. Moreover, no such arrangement is known which could be used to automatically actuate the material feed or similar functions in response to predetermined indications on the scale.

A further disadvantage of this type of scale known from the prior art is the fact that the indicating station or indicating device is invariably directly associated with the main body of the scale. In practical applications, however, it is often desirable that the actual body of the scale as well as the feed arrangement for supplying the articles to be weighed be located in one location, whereas the indicating device and the control device for selecting the zero setting of the scale be located at another location to permit maximum flexibility of set-up of such scales.

To my knowledge, no scale exists heretofore which overcomes all of these disadvantages and which provides all of the advantages which have been enumerated above as being desirable.

SUMMARY OF THE INVENTION

The present invention overcomes the disadvantages outlined above, and provides the indicated desired advantages.

More particularly, the present invention comprises a scale which is of relatively simple construction and which is capable of mastering all weighing functions, regardless of whether large, very large or very small weights are to be measured.

Furthermore, the present invention provides a scale which permits a quick but yet accurate remote setting of the zero position, and which also permits an accurate remote indication of the deviation from such zero position.

The present invention also provides a scale which permits selectively a zero indication when the scale does not carry a load to be weighed, thus enabling a control over the zero setting of the scale.

Furthermore, the scale in accordance with the present invention is capable of yielding control impulses for controlling various associated functions, such as the feed of material and the operation of registering or other devices, without requiring any significant additional economic or technological investment.

In accordance with one feature of my invention, I provide a scale which comprises balance means including a balance member having spaced end portions which are respectively located on opposite sides of a fulcrum. My novel scale further comprises first biasing means which biases the above-mentioned balance member to one side of the fulcrum, and second biasing means which normally counteracts the first biasing means and which maintains the member in a position of equilibrium. Further provided on my novel scale is selector means for reducing the biasing force exerted by the second biasing means by selectable amounts each of which corresponds to a given weight, and indicator means operatively associated with the balance member for indicating when the latter is in a position of equilibrium, as well as for indicating deviations from such a position. Finally, my novel scale also comprises load-supporting means which is operatively associated with the balance member and which is arranged to support a variable-weight load whereby, when the weight of such load equals the corresponding reduction in the biasing force selected with the selector means, the balance member is restored to its position of equilibrium.

In a preferred embodiment of my invention, the balance means, which hereafter for the sake of convenience will be identified as the "balance beam," is maintained in its equilibrium position by means of a counter weight. The second biasing means which normally balances the counter weight, comprises advantageously a plurality of so-called substitution weights which are remotely controllable, either mechanically-electrically or mechanically-pneumatically. If the remote control is effected mechanically-electrically, it is advantageous in accordance with the present invention to provide engaging devices such as forks or hooks which are movable my means of electromagnets and which can also be moved, together with the electromagnets, by one or more electric motors.

If the type of weighing or sorting to be done is very simple, it is possible and advantageous to provide a single substitution weight. To indicate directly a deviation from the zero point, it is advantageous to provide a carrier which is operatively connected to the balance beam and is movable in response to movements of the balance beam, a slotted segment which is connected to and moves with the carrier, and an indicator or pointer which moves along a plus-minus scale. Of course, it is also possible in accordance with another advantageous embodiment of the invention to provide the plus-minus indicating arrangement as a remote indicator with analogue-type scale in which each graduation of the scale is associated with an electric bulb or the like, which in turn cooperates with light-sensitive means, and in which relay means are associated with the various signal generating devices constituted by a respective bulb and light-sensitive means so that, when a relay is activated and in response to movement of a slotted segmental member and passage of light through the slots of such member, the scale indication "jumps" from graduation to graduation. Of course, if desired it is possible to provide the remote indication of weight, that is the reading, directly in form of numbers.

Another advantageous embodiment of the novel scale in accordance with the present invention provides for control of the feeding or similar function, and if desired for actuating of a print-out device, by the impulses emanating from the signal generators and the relays associated therewith. In this embodiment the impulses which actuate the individual light bulbs pass via branch connections to a control device which controls the material feed and can in this device perform various functions, for instance by switching the device over from fast-feed operation to slow- or precision-feed operation. Of course, the impulses which cause illumination of the light bulbs immediately adjacent to the zero indicator, can simultaneously be utilized for the zero-setting control and for controlling the predetermined weight.

Another possibility in accordance with the present invention is to permit manual or automatic remote release of the substitution weights upon completion of each filling and weighing operation, so as to return the scale to zero position. In this connection, it should be pointed out that it is also both desirable and possible in accordance with the present invention if the impulses which reach the control device mentioned above are utilized, after the filling and weighing function is terminated in the individual instance, for controlling the actual zero-setting position of the scale to make possible an automatic determination whether the desired pre-selected weight has been actually reached or, if the load platform is of the type which comprises a container which is filled with the material to be weighed, whether this container has been actually emptied upon termination of the individual weighing function.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
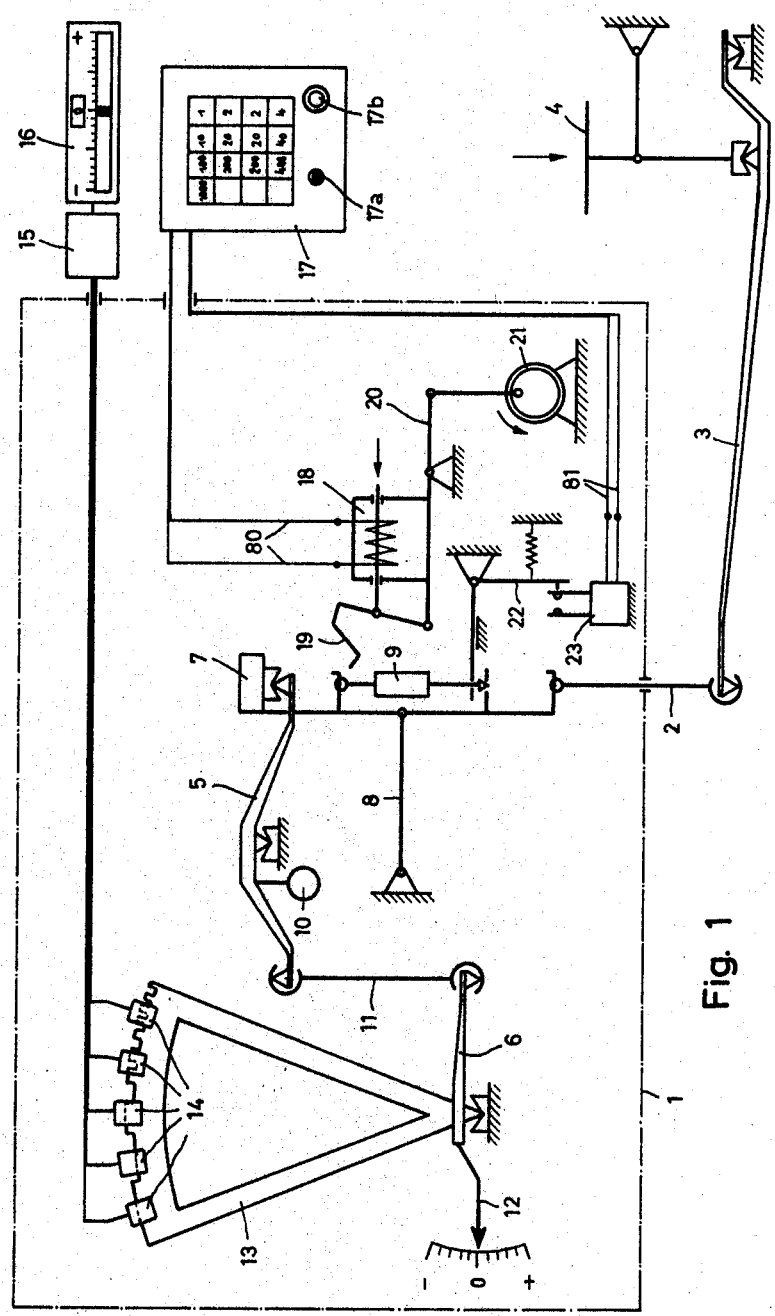
FIG. 1 is a somewhat schematic diagram of a scale in accordance with the present invention.

Referring to the drawing in detail, and first to the somewhat schematic illustration of FIG. 1, the basic construction and operation of a scale in accordance with the present invention will now be discussed.

A substantially closed housing 1 is indicated in FIG. 1 by means of chain lines and it will be seen that a rod arrangement 2 extends into this housing, such rod arrangement 2 being connected with a single-armed lever 3 or, as is possible not not shown in the drawing, with a lever arrangement or train including several levers. The lever 3 in turn is connected with a load platform 4 and is suitably fulcrumed on knife-edge bearings which are not separately identified with reference numerals, but which are clearly illustrated in FIG. 1.

The arrangement within the housing 1 is constructed in accordance with the present invention. It comprises a balance beam 5 which is fulcrumed on a knife-edge bearing. One side or arm of the balance beam 5 is connected with a support or carrier lever 6 which in turn is integral or secured to a segment member 13 whose upper edge is provided with a plurality of slots or cutouts. The carrier 6 is fulcrumed on a knife-edge bearing, and is in turn connected with the balance beam 5 via a connecting rod 11. A counter weight 10, which of course can also be a spring or similar biasing means, is provided on that arm which also carries the rod 11 and tends to tilt the balance beam towards the left as shown in FIG. 1.

A load or stress-transmitting member 7 is associated with the other arm of the balance beam 5 and is supported thereon by way of another knife-edge bearing. Stress-transmitting member 7 is connected to the housing 1 by means of a support 8. The lower end of the stress-transmitting member 7 is operatively connected with the connecting rod 2 which extends from the housing 1.

A predetermined number and type of so-called substitution weights is supported on the stress-transmitting member 7, depending therefrom, and such weights are indicated by a reference numeral 9, only one being shown in FIG. 1. It will be evident that a single weight 9 can be provided as readily as a plurality of such weights, and that if a plurality of the weights 9 is provided, these weights can all be different from one another. The various masses which are supported on the knife-edge bearing or bearings of the fulcrumed balance beam 5, namely, the stress-transmitting member 7, the weights 9, the lever 3 and the load platform 4, balance the counter weight 10 which is associated with the other arm of the balance beam 5.

As indicated earlier, the carrier lever 6 has rigidly secured thereto or integral therewith a slotted segment member 13 which is supported on a knife-edge bearing, and further an indicator or pointer 12. This pointer is also rigid with the carrier member 6 and cooperates with a scale which is not specifically denoted by a reference numeral but which will be seen to have graduations extending to the plus-side and to the minus-side of a zero-setting point. Thus, this scale permits direct reading of the weight of loads placed onto the platform 4. The segment member 13, on the other hand, is provided to make possible a remote indication of the weighing results. To this end, the member 13 is provided in its uppermost edge, as indicated in FIG. 1, with a plurality of slots or notches or cutouts which are not numbered but which are clearly shown in the drawing. These cutouts may, for instance, represent binary coding in a manner well known per se and provide the desired indicating function by co-operation with a plurality of signal generators or sensing devices 14 which may, for instance, comprise light sources arranged on one side of the upper edge of the member 13 and light-sensitive elements arranged on the other side juxtaposed with the respective light sources so that, as the member 13 and its upper edge move between the respective light sources and light-sensitive elements, the interruption and restoration of the light beams of each of the devices 14 results in the generation of signals indicative of the position of pointer 12. With this arrangement it is for instance possible to provide 32 calibrations, i.e., to provide a scale having 32 identical calibrations. Of course it should be understood that it is possible to deviate from the arrangement just described and to select instead a system of analogous indicating functions, for instance, by way of inductive indication.

The signal generators 14 are connected in a decoder circuit 15 which can be of known construction and comprises customary amplifiers and relays for providing an output signal which is fed to a digital-type remote indicator 16 on which the setting of the scale can be read. The output of the circuit 15 can also be supplied to a control arrangement for the feeding or sorting operation.

The weights 9 are, as has been indicated earlier, so-called substitution weights. Their number and respective weight is so calculated that any desired weight can be selected within a predetermined range of measurement. Thus, if for instance 12 weights are provided corresponding to 1, 2, 2, 4, 10, 20, 20, 40, 100, 200, 200 and 400 units or a particular weight, it is possible to select 999 settings which always deviate from one another by one unit of weight. FIG. 1 shows that in addition to the remote indicator 16 there is a remote control panel, identified by reference numeral 17. Of course both the remote indicator 16 and the remote control panel 17 can be provided in combination with one another, for instance in an apparatus control console or the like. In any case, the control panel 17 is advantageously but not necessarily provided with a plurality of push buttons which activate contacts associated with the respective weights 9. The arrangement can be such that each button corresponds to the given one of the weights 9, or it can be a decimal arrangement. The push buttons can of course be replaced by rotary switches or other suitable actuating instrumentalities. It is to be noted that if filling and weighing of two or more components into a container is to be accomplished, a separate setting arrangement is necessary for each component to be supplied to the load platform 4.

The selection of weights 9 is as follows: Each of the weights 9 is associated with an electromagnet 18, for instance a relay or a solenoid whose armature is operatively connected with a movable fork 19 which, when the respective electromagnet 18 is energized, moves under an engagement portion provided on the respective weight 9. It will be evident that the electromagnets 18 could be replaced by small piston and cylinder arrangements. In either case, however, the electromagnets 18 or the piston and cylinder arrangements are mounted on a tiltable carrier 20 which is operatively connected to an electric motor 21 in such a manner that, when the motor 21 is operated, the respective fork 19 with its associated electromagnet 18 is lifted in the direction of the arrow and thus raises the associated weight 9 from its support on the member 7. Of course, the forks 19 which have not been displaced by their associated electromagnets 18 (not shown) are similarly lifted by operation of the electric motor 21. However, since they have not been moved beneath the engagement portions of the weights 9 associated with them they cannot come in contact with such engagement portions and the non-selected weights remain connected to the member 7.

The lower end of each of the weights 9 is provided with a suitable contact member, shown in FIG. 1 but not denoted by a reference numeral, which on lifting of the respective weight engages a double-armed lever 22 and tilts the same, resulting in closing of a switch 23. The electric motor 21 is activated in the illustrated embodiment by depressing a push button 17a on the control panel 17 for rotation in a sense to lift the tiltable carrier 20. A further push button 17b on the control panel 17 activates the electric motor 21 for returning the tiltable carrier 20 to its starting position wherein all of the weights 9 are again returned to their connected positions on the member 7. Of course, when all of the weights 9 are thus connected with the member 7, the scale is returned to a zero-setting position. Such returning of the weights 9 to connection with the member 7 can be accomplished automatically after each filling and weighing cycle for permitting zero-setting control, that is for permitting a determination whether the container provided on or with the load platform 4, if any, has been properly emptied. It will be understood that when the setting of the predetermined weight is cancelled at the control panel 17, the forks 19 which were originally advanced by their associated electromagnets 18 are withdrawn to their respective rest positions.

Operation of the novel scale is as follows: Assuming that articles such as bags or containers are to be filled with material to a predetermined weight on the load platform 4, or that articles of a predetermined weight are to be sorted and controlled as to weight on the load platform 4, the operator will depress that button on the control panel which corresponds to the desired predetermined weight. This results is advancing of the respective forks 19 under the engaging members of their associated weights 9. Thus, the desired weight is preselected and the operator depresses the button 17a which causes the motor 21 to tilt the carrier 20 to a position where the pre-selected forks 19 lift their associated weights 9 out of engagement with the member 7. As this occurs, the engaging portion at the lower end of each of the thus-lifted weights 9 activates the lever 22 associated with each weight and the respective lever in turn activates the associates switch 23 producing an impulse which is fed back to the control panel 17 and is used for a desired purpose, for instance, for illuminating a small bulb associated with the respective push button to provide a control function which indicates whether the respective weight was properly lifted.

It will be evident that lifting of the weights 9 destroys the equilibrium of the balance beam 5 which tilts downwardly on the left-hand side of FIG. 1 because of the provision of the counter weight 10. This, in turn, causes the carrier lever 6 to tilt and results in movement of the pointer 12 below the zero point of the direct-reading scale. Since the segment member 13 also tilts with the carrier lever 6, an indication is obtained by cutting off of the light beams in the respective signal-generating devices 14 and electrical impulses which are produced in this manner are fed to the decoder circuit 15 and from there are sent on to the remote indicator 16. If desired it is possible to provide conventional and well known means for preventing the carrier lever 6 from exceeding a predetermined range of angular movement since for the filling and sorting operations for which the invention is primarily intended it is necessary only to be able to have an observation of the relatively short range to either side of the zero-setting point.

As weighing takes place, that is, as material is being introduced into a container of the load platform 4, this material now replaces the weights 9 which have been removed by their associated forks 19. When the removed weights 9 are thus balanced exactly by the weight on the load platform 4, the carrier lever 6 returns the indicator 12 to zero position. Gradual return movement of these parts, and thus the segment member 13 to zero position is sensed by the signal generating devices 14 and the thus-generated impulses are fed via the decoder circuit 15 to the remote indicator 16. These impulses can be further utilized for certain control functions when the indicator 12 reaches a given position, that is, for instance before it reaches the zero-setting position. Thus, these impulses can be used for changing from a rapid feed to a precision-feed and they can also be utilized for terminating the feed when the indicator 12 reaches the zero setting position.

To determine, upon completion of a weighing operation whether the load platform 4 has been completely cleared, the button 17b of the control panel 17 is depressed to effect lowering of the carrier 20 by the electric motor 21. This, in turn, results in reconnection of the respective weights 9 with the member 7. If the load platform 4 has been completely cleared in the desired manner, the scale will respond to actuation of the button 17b by indicating zero-setting position. Of course it is possible and desirable to provide suitable control means, for instance a separate indicating means in the remote indicator 16, which indicates the zero-setting position when this control operation is being performed, thereby indicating at all times whether the scale is functioning properly, that is whether the weights are all returned to the member 7 or whether some of the weights are still lifted off.

Figure 2:
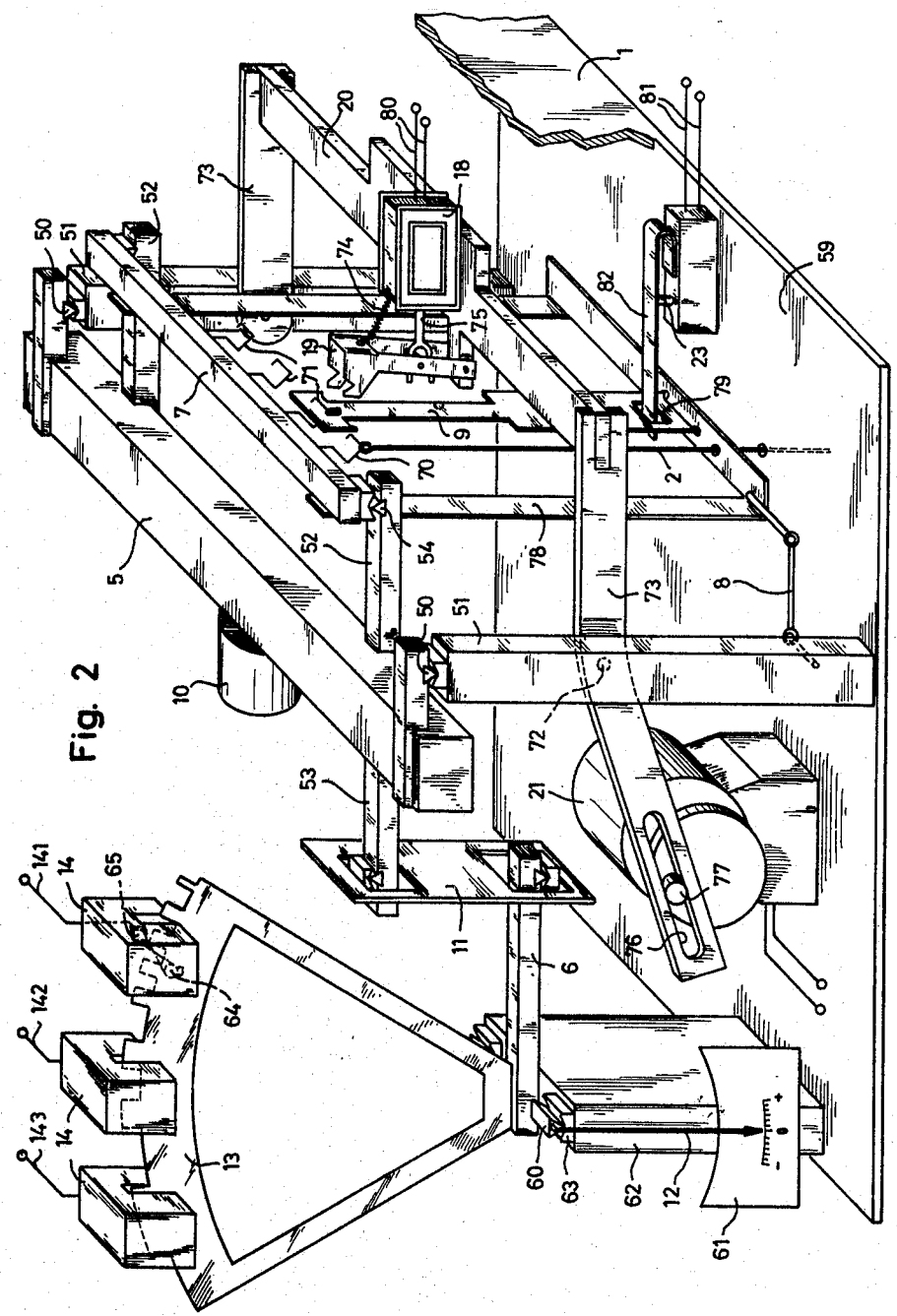
FIG. 2 is a partly sectional perspective view of the scale.

While FIG. 1 shows the construction of the novel scale in a somewhat schematic form, FIG. 2 shows the details of a specific embodiment. Such parts which correspond to the parts shown in FIG. 1 are identified by the same reference numerals as have been used in FIG. 1. It will be seen that the housing 1 is shown broken away to provide a better indication of the interior thereof. The rod 2 passes through an opening in the housing and is connected with the lever 3 in the manner indicated in FIG. 1 and not shown in FIG. 2. The weighing beam or balance beam 5 is shown in FIG. 2, as is the carrier lever 6 and the stress transmitting member 7. The balance beam 5 is supported in knife-edge bearings 50 on a frame 51 which in turn is secured to the bottom wall 59 whereon there are secured the substitution weights 9 in a manner which is still to be described. The load which rests on the load platform 4 (see FIG. 1) acts upon these arms 52. Extending in opposite direction from the arms 52 is a further arm 53 which is connected via rod 11 with the carrier lever 6 for the indicating arrangement. The counter weight 10 is directly secured to the balance beam 5, as shown in FIG. 2.

The carrier lever 6 is supported on knife-edge bearings, and rests on one of these bearings, which is identified by a reference numeral 60. Secured to or integral with the carrier lever 6 is the segment member 13 which cooperates with a plurality of signal generating devices 14 (three shown). Secured to the knife-edge bearing 60 of the carrier lever is the indicator or pointer 12 which cooperates with a plus-minus scale 61 along which it moves freely. The scale 61 is secured to a support member 62 which is provided at its upper edge with a socket 63 wherein the knife-edge bearing 60 is held.

Each of the signal-generating devices 14 comprises in the illustrated embodiment a light source 64 located at one side of the upper edge of member 13, and a photoelectric cell 65 located at the other side of the upper edge of member 13. Each of the devices 14 is connected with a conductor 141, 142, 143 respectively, these conductors being in turn connected with the decoding circuit 15 in the manner shown more particularly in FIG. 3. As the member 13 turns about the knife-edge bearing 60, its notched upper edge moves between the light sources and photoelectric cells of the respective devices 14 and, depending upon the position of its notched portions, permits or prevents passage of light beams from the respective light sources 64 to the associated photoelectric cells 65. The resulting electrical impulses are fed via the conductors 141, 142, 143 to the decoder circuit 15 which will be described in conjunction with FIG. 3. While only three of the signal-generating devices 14 have been shown in FIG. 2, it will be evident that their number can be selected at will.

The stress-transmitting member 7 is constituted by an elongated traverse which is supported on knife-edge bearings 54 which in turn are provided on the arms 52 of the balance beam 5. The member 7 is secured to the frame 51 by the support 8 through the intermediary of a frame 78. The member 7 is further provided with a hook 70 to which there is secured the rod 2 which leads to the non-illustrated lever 3 (see FIG. 1). Further hooks 71 are provided on the member 7 and on these hooks the substitution weights 9 are secured. The form of the weights 9 is shown in FIG. 2 but can of course be selected differently from that illustrated. For the sake of simplicity, only three of the hooks 71 are shown, and only a single one of the weights 9 is illustrated but it will be clear that the number of hooks and associated weights will be selected in accordance with the desired weighing operations which are to be carried out with the scale.

The tiltable carrier 20 can turn about stationary pins 72 provided on the frame 51 and includes turnable arms 73. The main portion of the carrier 20 has mounted thereon several electromagnets 18, one for each of the weights 9. Again, only one of these electromagnets 18 is shown to avoid overcrowding of FIG. 2. The illustrated electromagnet 18 is connected with the control panel 17 via conductors 80 in a manner shown more specifically in FIG. 3. Further connected to the carrier 20 is the fork 19 which is biased to its rest position by a spring 74. The armature 75 of electromagnet 18 is so connected with the fork 19 that, when the electromagnet is energized, the armature 75 will move the fork under the T-shaped upper end portion of the weight 9.

A free end portion of the tiltable arm 73 of the carrier 20 is provided with an elongated slot 76 and a pin 77 of the electric motor 21 is received in this slot 76 so that, as the motor 21 turns, the arm 73 and thereby the entire carrier 20 is moved upwardly or downwardly about the stationary pin 72 on frame 51. It will be clear that, when the carrier 20 is lifted in upward direction, that fork, or those forks which have been moved into registry with the T-shaped upper end or ends of respective weights 9 will engage such weights and will lift the same off their associated hooks 71. It will also be clear that the mechanical-electrical selection and control of the weights 9 can be replaced by a pneumatic-mechanical arrangement. As shown in FIG. 2, the lower edges of the weights 9 are normally supported on the frame 78 which is connected with the member 7. In other words, the lower edges of the weights 9 rest on the frame 78 when such weights are suspended on the respective hooks 71. The lower edge of each weight 9 is provided with a slot 79 through which a leaf spring or trip 82 extends freely and this leaf spring moves upwardly when the associated weight 9 is lifted by operation of the corresponding fork 19. When this takes place, the switch 23 is actuated and produces a signal which is fed to the control panel 17 via conductors 81.

Figure 3:
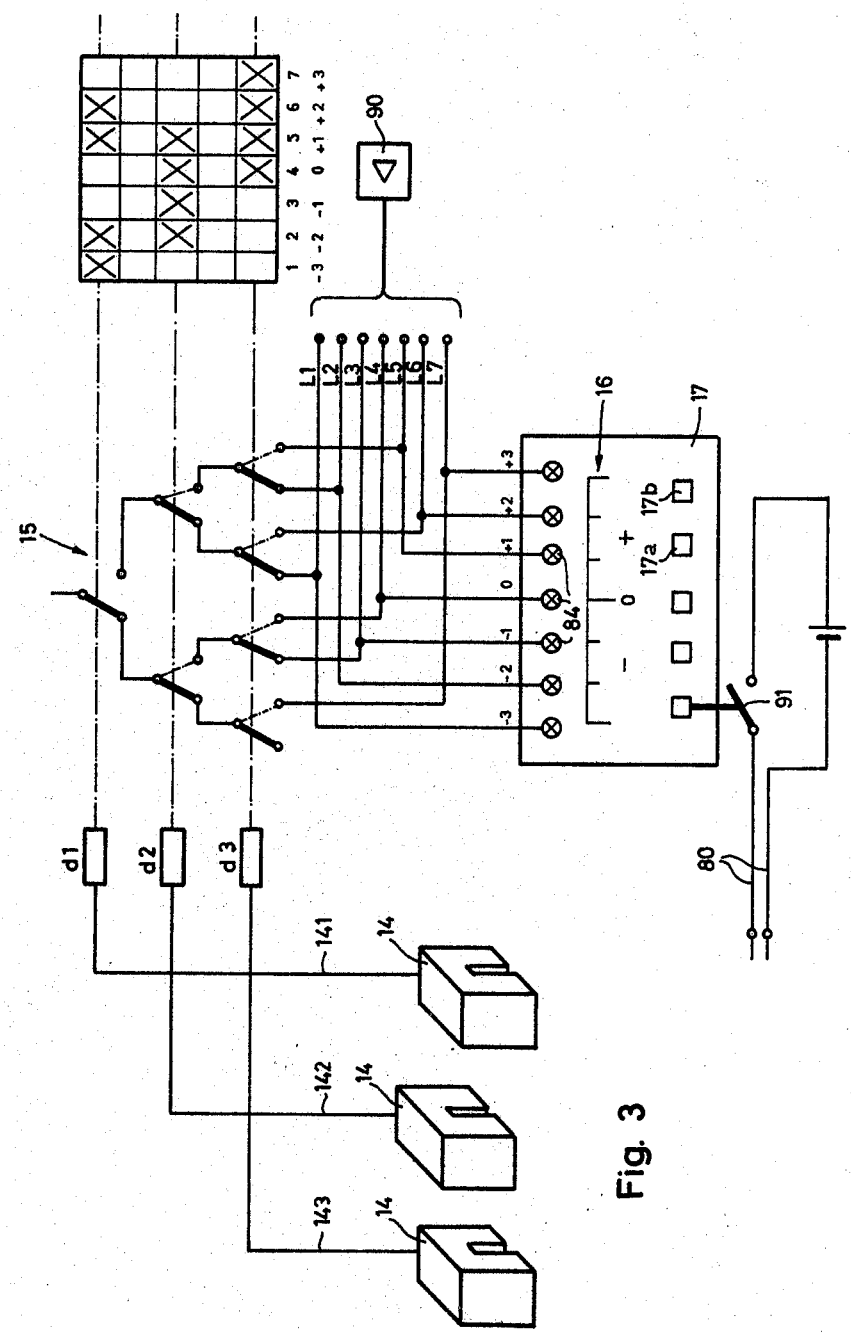
FIG. 3 illustrates an electrical wiring diagram for a scale of the type shown in FIG. 2.

Discussing now FIG. 3, it should be pointed out that this illustration provides an indication how a wiring diagram for the embodiment of FIG. 2 may look in principle. The signal generators 14 produce signals in the manner already discussed above. Such signals are conveyed via the conductors 141, 142 and 143 to the decoder circuit 15. Intermediate the respective signal generators 14 and the decoder circuit 15, these signals are amplified by means of any well known amplifiers or amplifying arrangements which are not shown in the drawing.

The wiring diagram of FIG. 3 is illustrated as having only three of the signal generators 14 and accordingly the decoder circuit 15 comprises only three relays $d1$, $d2$ and $d3$, each of which is installed in one of the conductors 141–143. The control panel 17 is assumed in the arrangement of FIG. 3 to be combined with the remote indicator 16 and the latter is provided with a plurality of signal lamps or bulbs 84 each of which corresponds with one of the calibrations of a plus-minus scale provided on the remote indicator 16. The wiring diagram of FIG. 3 indicates how excitation of a given relay serves to illuminate predetermined ones of the bulbs 84. Each cross indicates that the respective relay is excited.

In the wiring diagram it will be seen that the contacts of the relays which are shown in full lines are illustrated in their rest positions, that is in the position which they assume when the relay is not excited. The operating position, that is the position which the contacts assume when the associated relay is excited, is indicated in dot dash lines and it will be seen, for instance, that if the relays $d2$ and $d3$ are excited the bulb 84 which corresponds to the zero calibration of the scale on remote indicator 15 will be illustrated. This is so because excitation of the relays $d2$ and $d3$ causes movement of the contacts of these relays to the dot dash line position, whereas the contact of relay $d1$ remains in the full line rest position so that the circuit associated with $d1$ remains blocked.

It will be evident that the bulbs 84 of remote indicator 16 will be illuminated in succession as the slotted segment 13 moves gradually to its zero-setting position as weight is added on the load platform 4 shown in FIG. 2. Thus, the novel arrangement in accordance with the present invention provides at the remote indicator 16 an analog-type indication which jumps from calibration to calibration until the zero position is reached. Of course, it is also possible to modify the arrangement so that the impulses which are originated in the decoder circuit 15 provide an immediate visual reading of the results in figures, rather than on a calibrated scale. This arrangement is not illustrated but the possibilities therefor will be readily understood by those skilled in this field.

The conductors which extend between the relays $d1$–$d3$ and the various bulbs 84 on the remote indicators 16 are provided in respective branch circuits $L_1$, $L_2$ . . . $L_7$, all of which are connected with a control device 90. This control device can be of any well known construction and the circuits $L_1$–$L_7$ serve to utilize the electrical impulses which are supplied from the relays $d1$–$d3$ to the bulbs 84 for indicating the weighing function, to control the weighing operation itself. Thus, the electric current which illuminates the bulb 84 associated with the zero-setting position on remote indicator 16 can simultaneously be fed to the control device 90 and can, via the latter, serve to interrupt the feed of material into the container on load platform 4. Thus, the present invention makes it possible to use in a very simple, economical and virtually foolproof manner one and the same electrical impulse for indicating the measured value on the remote indicator 16 and for simultaneously controlling the feed or sorting arrangement and/or a registering or printing device. As has already been pointed out, the remote indicator 16 is shown combined with the control panel 17. In other words, the remote indicator 16 and the control panel 17 are assumed to be located in a common housing. The push buttons of control panel 17 are identified with reference numerals 17' and the circuits associated with these various push buttons are assumed to be identical in every case. For this reason only one such circuit is shown and it will be seen that it is associated with the first or leftmost one of the push buttons 17' and comprises conductors 80 connected with a contract 91 which is controlled by the push-button 17', and these conductors 80 are connected with the electromagnet 18 shown in FIG. 2. The push buttons 17a and 17b are provided for the purposes discussed earlier and they are of course also connected with conductors which are not illustrated but which will be readily evident to those skilled in the art. The circuits which are associated with the push buttons 17a and 17b serve for controlling the operation of the electric motor 21 and the push button 17b is so connected that it can serve to effect suspension of all of the weights 9 on the member 7 for permitting zero-setting control of the novel scale. The various push buttons which serve for releasing the weights 9 may but need not be constructed as illuminated buttons, that is buttons which become illuminated when they are depressed and when the respective weight 9 is released from the member 7. If this type of arrangement is provided, then the illumination of the respective buttons is effected via the conductors 81 which are connected to the respective switches 23.

Evidently, many modifications are possible for the novel scale in accordance with the present invention without, however, deviating in any way from the concept of the invention. All of such modifications are, of course, intended to be encompassed in the protection sought herein. The novel scale disclosed herein will be seen to provide a variety of important new advantages. Summarizing these it may be stated that the scale is of relatively simple construction, that it requires in operation only relatively small travel for the various movable parts, and that the scale is suited for all weighing functions which are encountered in practical applications, and in particular for the weighing of even the smallest weights since for instance the substitution weights 9 can be selected at the complete discretion of the scale operator. The novel arrangement can, if necessary, utilize various lever or other connections with basic scales of other types than that shown in FIG. 1 by way of example. Thus, the arrangement disclosed here is particularly suitable for manufacturing in series of large or small quantities, making it even more economical than it already is in view of its simple construction. The arrangement of the remote indicator and the remote control panel, as well as the operation of the substitution weights permit not only an accurate and quick reading of the weights measured by the novel scale, but a quick control of the pre-selected weight and a quick change of the pre-selected weight upwardly or downwardly. Furthermore, the scale of the present invention permits a rapid and accurate zero-setting control so that it can always be determined whether all of the substitution weights 9 have been returned to their rest positions in which they depend from the member 7, and also whether all material has been removed from the load platform 4. Furthermore, the electrical impulses which originate during operation of the novel scale serve not only for indicating the weight, but also for controlling the filling, sorting and/or registering functions which are associated or can be associated with the scale without, however, requiring any significant additional economic or technological expenditure.

What is claimed as new and desired to be protected by Letters Patent is set forth in the appended claims:

1. A scale, comprising a fulcrum; balance means comprising a balance member tiltably supported by and having spaced end portions respectively located on opposite sides of said fulcrum; biasing means normally maintaining said member in a position of equilibrium; selector means for reducing the biasing force exerted by said biasing means by selectable amounts each of which corresponds to a given weight; indicator means operative for indicating when said balance member is in a position of equilibrium, as well as deviations from such position, said indicator means including lever means associated with said balance member, and a segment-shaped member associated with said lever means and arranged to tilt in response to movement of the same; and load-supporting mans operatively connected with said balance member and arranged to support a variable load whereby, when the weight of such load equals a correpsonding reduction in biasing force selected with said selector means, said balance member is restored to its position of equilibrium.

2. A scale as defined in claim 1, wherein said balance member is a balance beam.

3. A scale as defined in claim 1; and further comprising additional biasing means counteracting said first mentioned biasing means and tending to move said balance member to one side from said position of equilibrium.

4. A scale as defined in claim 3, wherein said additional biasing means comprises resilient means operatively connected with said balance member.

5. A scale as defined in claim 3, wherein said additional biasing means comprises a weight operatively connected with said balance member.

6. A scale as defined in claim 1, wherein said biasing means comprise a plurality of weights operatively associated with said balance member, and normally maintaining said balance member in a position of equilibrium.

7. A scale as defined in claim 6, wherein said weights are removably connected to said balance member.

8. A scale as defined in claim 7, wherein said selector means comprises electromagnetic means operative for means operative for selectively reducing said biasing force for selectable amounts.

9. A scale as defined in claim 8, wherein said electromagnetic means is arranged for selectively disassociating predetermined ones of said weights from said balance member to thereby reduce said biasing force.

10. A scale as defined in claim 7, wherein said selector means comprise electrically operated means for selectively disassociating predetermined ones of said weights from said balance member.

11. A scale as defined in claim 7, wherein said selector means comprise fluid operated means for selectively disassociating predetermined ones of said weights from said balance member.

12. A scale as defined in claim 1, wherein said selector means comprises remote-control means.

13. A scale as defined in claim 9, wherein said electromagnetic means comprise support means movable into and out of supporting engagement with respective ones of said weights, and electromagnetic actuating means for moving said support means into and out of such engagement.

14. A scale as defined in claim 13, wherein said support means comprises a carrier having a portion which is adapted to be lifted and lowered, and a plurality of engaging members each adapted to be moved into and out of supporting engagement with a respective weight and mounted on said carrier, said electromagnetic actuating means comprising a plurality of electromagnetic devices carried on said carrier and each operatively associated with at least one of said engaging members.

15. A scale as defined in claim 14; and further comprising remote-control means operatively connected with said electromagnetic devices for deactivating all such devices simultaneously and for thereby returning all of said weights to operative association with said balance members.

16. A scale as defined in claim 1, wherein said biasing means comprises a single weight operatively associated with said balance member.

17. A scale as defined in claim 1, wherein said segment-shaped member comprises an edge portion with a plurality of cutouts, and wherein said indicator means further comprises a plurality of photoelectric sensors arranged adjacent said edge portion and adapted to generate signals in response to movement of said cutouts past said sensors.

18. A scale as defined in claim 1, wherein said indicator means further comprises a graduated scale provided with plus-minus graduations, and a movable pointer connected to said lever means and associated with said graduated scale.

19. A scale as defined in claim 17, wherein said indicator means comprises a remote indicator arrangement, and wherein said remote indicator arrangement includes an analog-type plus-minus indicating scale.

20. A scale as defined in claim 19, wherein said indicating scale is provided with a plurality of graduations and with a corresponding plurality of illuminating devices each associated with one of said graduations; said indicator means further comprising electric circuit means operatively connecting the respective illuminating devices with respective ones of said photoelectric sensors whereby successive ones of said devices are energized in correspondence with movement of said segment-shaped member.

21. A scale as defined in claim 19, wherein said indicating scale is provided with a plurality of graduations and with a corresponding plurality of indicia-forming devices each associated with one of said graduations; said indicator means further comprising electirc circuit means operatively connecting the respective indicia-forming devces with respective ones of said photoelectirc sensors whereby successive ones of said devices are energized in correspondence with movement of said segment-shaped member.

22. A scale as defined in claim 20, wherein said circuit means comprises normally inactive switch means interposed between said photoelectric means and said illuminating devices.

23. A scale as defined in claim 22, wherein said switch means are relay means.

24. A scale as defined in claim 20, wherein said circuit means comprises at least one branch arranged to be operatively associated with an auxiliary control device so that impulses energizing said illuminating devices smultaneously operate such control device.

(References on following page)

References Cited

UNITED STATES PATENTS

| | | | |
|---|---|---|---|
| 3,111,180 | 11/1963 | Johnson | 177—252 |
| 3,193,036 | 7/1965 | Meier | 177—248 |
| 3,323,365 | 2/1966 | Mayer et al. | 177—252 X |

FOREIGN PATENTS 1,001,257  8/1965  Great Britain.

ROBERT S. WARD, JR., Primary Examiner

U.S. Cl. X.R.

177—176, 237, 248; 252